(12) United States Patent
Han

(10) Patent No.: US 12,225,892 B2
(45) Date of Patent: Feb. 18, 2025

(54) ARTIFICIAL BAIT WITH MOVABLE HOOK

(71) Applicant: Jeongo Han, Siheung-si (KR)

(72) Inventor: Jeongo Han, Siheung-si (KR)

( * ) Notice: Subject to any disclaimer, the term of this patent is extended or adjusted under 35 U.S.C. 154(b) by 57 days.

(21) Appl. No.: 17/925,525

(22) PCT Filed: Jul. 8, 2021

(86) PCT No.: PCT/KR2021/008707
§ 371 (c)(1),
(2) Date: Nov. 15, 2022

(87) PCT Pub. No.: WO2022/045573
PCT Pub. Date: Mar. 3, 2022

(65) Prior Publication Data
US 2023/0189775 A1   Jun. 22, 2023

(30) Foreign Application Priority Data
Aug. 31, 2020   (KR) .................. 10-2020-0109970

(51) Int. Cl.
*A01K 85/00*   (2006.01)
*A01K 85/02*   (2006.01)

(52) U.S. Cl.
CPC .......... *A01K 85/021* (2022.02); *A01K 85/023* (2022.02); *A01K 85/028* (2022.02)

(58) Field of Classification Search
CPC .................. A01K 85/021; A01K 85/1811; A01K 85/028; A01K 85/023; A01K 85/22
See application file for complete search history.

(56) References Cited

U.S. PATENT DOCUMENTS

| 2,349,391 | A | * | 5/1944 | Usoskin | ................. | A47B 77/14 |
| | | | | | | 312/307 |
| 2010/0115822 | A1 | * | 5/2010 | Huddleston | ............ | A01K 85/02 |
| | | | | | | 43/42.15 |

FOREIGN PATENT DOCUMENTS

| JP | 2000270718 A | | 10/2000 |
| JP | 2003125674 A | | 5/2003 |
| JP | 2005261242 A | | 9/2005 |
| JP | 2008212129 A | | 9/2008 |
| KR | 20160003707 U | | 10/2016 |
| KR | 20210122604 A | * | 4/2020 |
| KR | 20220022172 A | * | 8/2020 |
| KR | 102222779 B1 | | 3/2021 |

OTHER PUBLICATIONS

International Search Report for PCT/KR2021/008707 mailed Oct. 6, 2021.

* cited by examiner

*Primary Examiner* — Brady W Frazier
*Assistant Examiner* — Shanna Danielle Glover
(74) *Attorney, Agent, or Firm* — Renaissance IP Law Group LLP

(57) ABSTRACT

The present inventive concept relates to an artificial bait with movable hooks that is capable of easily catching cephalopods such as octopus ocellatus, cuttlefish, and the like underwater. According to the present inventive concept, in the process of performing hook setting, the movable hooks located at one end portion of the body move to the other end portion of the body, so that the cuttlefish around the body can be easily caught by the movable hooks suddenly protruding outward.

8 Claims, 5 Drawing Sheets

ARTIFICIAL BAIT WITH MOVABLE HOOK

TECHNICAL FIELD

The present disclosure relates to an artificial bait with movable hooks, and more specifically, to an artificial bait with movable hooks that is capable of easily catching cephalopods such as octopus ocellatus, cuttlefish, and the like underwater.

BACKGROUND ART

Fishing is divided into fishing for a job and fishing for recreation. The fishing for recreation is called recreational fishing, and with the improvement of income levels, the application of a five-day work week, and the development of leisure industries, today, the recreational fishing is considered as one of leisure activities that is capable of allowing people who get away from their cities to directly experience ecosystem around streams, rivers, or coasts as well as to simply see and enjoy natural environments and ecosystem. In specific, sea fishing as well as swimming is one of main marine recreation and tourism activities and has creative leisure and experience functions. Through the sea fishing, people's stress in their daily lives can be removed so that they have new energy.

Cephalopods include cuttlefish, squid, octopus ocellatus, octopus, and the like, and they are caught by hook setting, not by the use of a bait like a paste bait, but by the use of a dedicated lure like a bait log. The hook setting is carried out by putting a lure into the sea and rolling up or lifting a fishing line to allow the cephalopods around the lure to be caught by the hooks of the lure.

FIG. 1 shows a conventional fishing tool used for catching cephalopods. Referring to FIG. 1, the conventional fishing tool is formed of an artificial bait 10 having a body 12 having the similar shape to a live bait such as a craw fish, a weight 14 connected to the lower portion of the body 12, and a plurality of hooks 16 disposed on a tail of the body 12. So as to catch cephalopods by using the artificial bait 10, in a state where the artificial bait 10 is put into the sea from a boat, a fishing rod moves up and down to move the artificial bait 10. At the moment when octopus ocellatus confuses the artificial bait with a craw fish to bite the artificial bait, the hook setting is performed to allow the octopus ocellatus to be caught by the hooks.

If fishing for cephalopods is done by using the conventional artificial bait, the octopus ocellatus or octopus having a lot of curiosity may bite the artificial bait. However, cuttlefish having a lot of cautiousness may hit the artificial bait, and next, if the cuttlefish feels strange, it runs away. Accordingly, at the moment when a fishing beginner feels biting to thus perform the hook setting, the cuttlefish has already run away, so that it is hard to catch the cuttlefish unless the fisherman is professional.

DISCLOSURE

Technical Problems

Accordingly, the present inventive concept has been made in view of the above-mentioned problems occurring in the related art, and it is an object of the present inventive concept to provide an artificial bait with movable hooks that is capable of easily catching cephalopods such as octopus ocellatus, cuttlefish, and the like underwater.

Technical Solutions

To accomplish the above-mentioned objects, according to one aspect of the present inventive concept, there is provided an artificial bait including:
a body;
an elastic part located inside the body; and a hook member located inside the body and connected to the elastic part,
wherein the hook member may include:
a wire movable at the inside of the body in a longitudinal direction of the body; movable hooks protruding from one side of the wire located toward one end portion of the body in a peripheral direction of the body; and
a connector protruding outward from the other side of the wire located toward the other end portion of the body, passing through the other end portion of the body, and connected to a fishing line, and the elastic part is located on end portion or the other end of the interior of the body, while being connected to the wire, to apply elastic pressure in a direction where the movable hooks become close to one end portion of the body, whereby if the elastic pressure of the elastic part is transferred to the wire to move the movable hooks in a direction toward one end portion of the body, the movable hooks are located inside the body, whereas if external pressure stronger than the elastic pressure is applied to the connector to move the movable hooks in the direction toward the other end portion of the body, the movable hooks pass through the periphery of the body and are protrudingly exposed to the outside of the body.
Further, the body may include
a first convex portion and a concave portion extending sequentially in a direction from one end portion toward the other end portion thereof in the longitudinal direction thereof, while being decreased in diameter in a direction from the first convex portion toward the concave portion, the first convex portion having a first sliding guide portion formed in a longitudinal direction thereof, the concave portion having a second sliding guide portion formed in a longitudinal direction thereof, the first sliding guide portion and the second sliding guide portion communicating with each other as an integral body with each other, the first convex portion having first guide holes formed in a direction from the first sliding guide portion toward the periphery thereof to guide the movable hooks moving therein, one side of the first guide holes communicating with the first sliding guide portion and the other side thereof passing through the periphery of the first convex portion, the concave portion having second guide holes formed in a direction from the second sliding guide portion toward the periphery thereof to guide the movable hook moving therein, one side of the second guide holes communicating with the second sliding guide portion and the other side thereof passing through the periphery of the concave portion, and if the movable hooks move to the first convex portion by means of the elastic pressure of the elastic part, the movable hooks are located inside the first guide holes, whereas if the movable hooks move to the concave portion by means of the external pressure applied to the connector, the movable hooks protrude outward from the second guide holes.
Further, the concave portion
becomes decreased in diameter toward the center in the longitudinal direction thereof, one end of the second guide holes being located at one end portion of the concave portion in the longitudinal direction of the concave portion which is connected to the first convex portion and the other end thereof being located at the center in the longitudinal direction of the concave portion, and each movable hook may include a protruding portion locked onto the other end portion of the corresponding second guide hole at the end of the wire and then protruding outward from the concave portion, when the movable hooks move to the concave portion, and an inclined portion bent inclinedly from the end of the protruding portion toward the other end portion of the concave portion in the longitudinal direction of the concave portion.

Further, the body may include a second convex portion extending integrally from the end portion of the concave portion located in the opposite direction to the first convex portion and a third sliding guide portion concavely formed in a longitudinal direction of the second convex portion to allow the wire to be movable therealong, the second sliding guide portion and the third sliding guide portion communicating with each other as an integral body with each other, the second convex portion comprising a first accommodation portion, a second accommodation portion, a third accommodation portion, and a fourth accommodation portion formed sequentially therein along the inner peripheral surface thereof around the third sliding guide portion, the first accommodation portion and the third accommodation portion facing each other, the second accommodation portion and the fourth accommodation portion facing each other, and weights are inserted into the first accommodation portion and the third accommodation portion, respectively, while closed empty space portions are being formed in the second accommodation portion and the fourth accommodation portion, respectively.

To accomplish the above-mentioned objects, according to another aspect of the present inventive concept, there is provided an artificial bait including:

a body; an elastic part located inside the body; and a hook member located inside the body and connected to the elastic part, wherein the hook member may include: a wire movable at the inside of the body in a longitudinal direction of the body; movable hooks protruding from one side of the wire located toward one end portion of the body to the outside of the body; and a connector protruding outward from the other side of the wire located toward the other end portion of the body, passing through the other end portion of the body, and connected to a fishing line, and the elastic part is located on end portion or the other end of the interior of the body, while being connected to the wire, to apply elastic pressure in a direction where the movable hooks become close to one end portion of the body, whereby if the elastic pressure of the elastic part is transferred to the wire to move the movable hooks protruding outward from the body in a direction toward one end portion of the body, whereas if external pressure stronger than the elastic pressure is applied to the connector, the movable hooks protruding outward from the body move in the direction toward the other end portion of the body.

Further, the body may include a first body, a movable body, and a second body extending sequentially in a direction from one end portion thereof toward the other end portion thereof in the longitudinal direction thereof, the movable body having a first sliding guide portion formed in a longitudinal direction thereof to allow the wire to be movable therealong, the second body having a second sliding guide portion formed in a longitudinal direction thereof to allow the wire to be movable therealong, the first sliding guide portion and the second sliding guide portion communicating with each other as an integral body with each other, the movable body having guide holes formed in a direction from the first sliding guide portion toward the periphery thereof to guide the movable hooks moving therein, one side of the guide holes communicating with the first sliding guide portion and the other side thereof passing through the periphery thereof, and if the elastic pressure of the elastic part is transferred to the wire, the movable hooks protruding outward from the movable body move to one end portion of the movable body, whereas if the external pressure stronger than the elastic pressure is applied to the connector, the movable hooks protruding outward from the movable body move to the other end portion of the movable body.

Further, the body may include a space portion formed at one end portion or the other end portion thereof to accommodate the elastic part therein.

Moreover, the movable hooks may protrude radially from one side of the wire.

In addition, the body may include auxiliary hooks protruding radially from the end portion thereof.

Further, the body may include buoyant portions as empty space formed therein.

Advantageous Effects

According to the present inventive concept, in the process of performing the hook setting, the movable hooks located at one end portion of the body move to the other end portion of the body, so that the cuttlefish around the body can be easily caught by the movable hooks suddenly protruding outward, while the body is not moving at all.

Further, in the process of performing the hook setting, the movable hooks hidden inside the body move along the second guide holes and protrude outward from the body, so that the cuttlefish, which is close to the body or carefully hits the body, is easily caught by means of the movable hooks unexpectedly protruding from the body.

Additionally, if the protruding portions of the movable hooks move lockedly onto the end portions of the second guide holes, the inclined portions of the movable hooks protrude outward from the second guide holes to the maximum extent, thereby allowing the cuttlefish to be more easily caught by the inclined portions.

Further, the first convex portion and the second convex portion have buoyancy, and in the state where the body is located underwater, accordingly, one side of the body can be kept at a horizontal state thereof, without sagging down toward any one side thereof.

DETAILED DESCRIPTION

According to one aspect of the present inventive concept, an artificial bait may include the following components:
a body;
an elastic part located inside the body; and
a hook member located inside the body and connected to the elastic part,
wherein the hook member may include:
a wire movable at the inside of the body in a longitudinal direction of the body;
movable hooks protruding from one side of the wire located toward one end portion of the body in a peripheral direction of the body; and
a connector protruding outward from the other side of the wire located toward the other end portion of the body, passing through the other end portion of the body, and connected to a fishing line, and
the elastic part is located on end portion or the other end of the interior of the body, while being connected to the wire, to apply elastic pressure in a direction where the movable hooks become close to one end portion of the body,
whereby if the elastic pressure of the elastic part is transferred to the wire to move the movable hooks in a direction toward one end portion of the body, the movable hooks are located inside the body,
whereas if external pressure stronger than the elastic pressure is applied to the connector to move the movable hooks in the direction toward the other end portion of the body, the movable hooks pass through the periphery of the body and are protrudingly exposed to the outside of the body.

According to another aspect of the present inventive concept, an artificial bait may include the following components:
a body;
an elastic part located inside the body; and
a hook member located inside the body and connected to the elastic part,
wherein the hook member may include:
a wire movable at the inside of the body in a longitudinal direction of the body;
movable hooks protruding from one side of the wire located toward one end portion of the body to the outside of the body; and
a connector protruding outward from the other side of the wire located toward the other end portion of the body, passing through the other end portion of the body, and connected to a fishing line, and
the elastic part is located on end portion or the other end of the interior of the body, while being connected to the wire, to apply elastic pressure in a direction where the movable hooks become close to one end portion of the body,
whereby if the elastic pressure of the elastic part is transferred to the wire to move the movable hooks protruding outward from the body in a direction toward one end portion of the body,
whereas if external pressure stronger than the elastic pressure is applied to the connector, the movable hooks protruding outward from the body move in the direction toward the other end portion of the body.

Mode for Invention

Hereinafter, an artificial bait with movable hooks according to embodiments of the present inventive concept will be described in detail with reference to the accompanying drawings.

Figure 1:
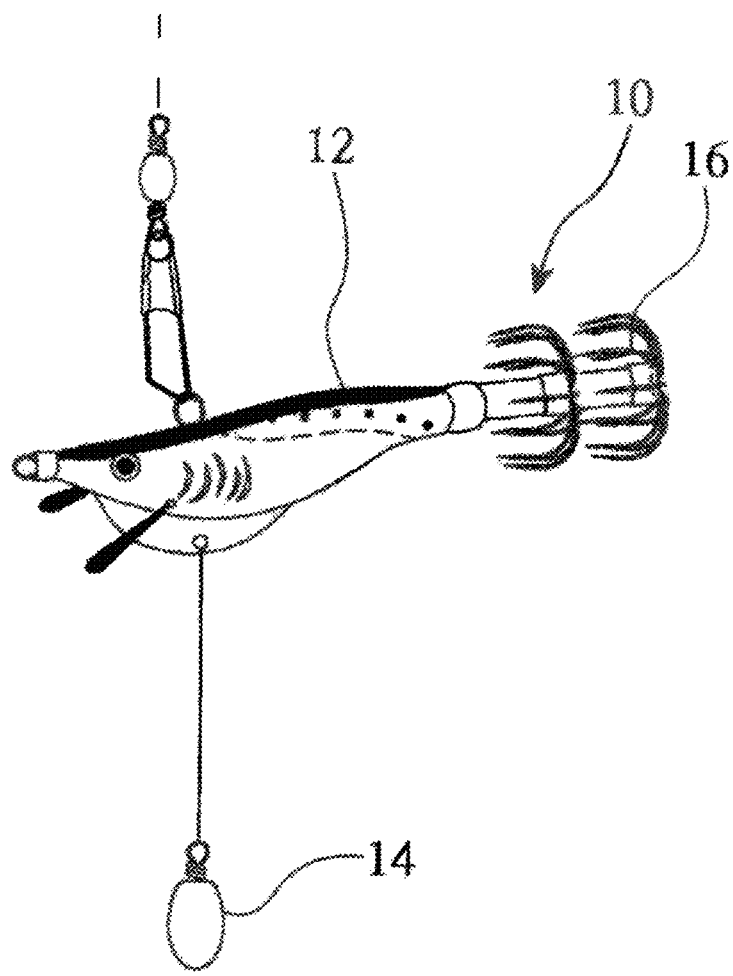
FIG. 1 shows a conventional fishing tool used for catching cephalopods.
Figure 2:
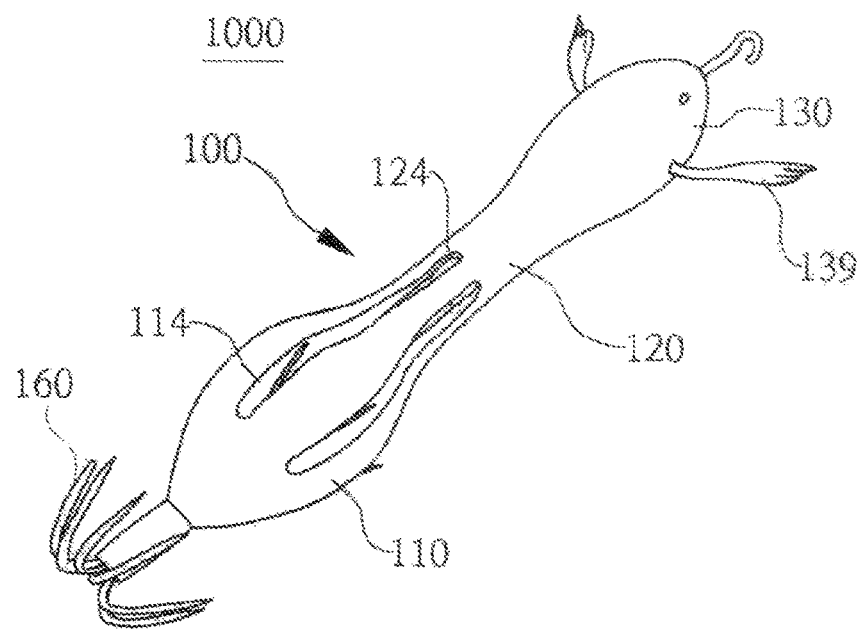
FIG. 2 schematically shows an artificial bait with movable hooks according to a first embodiment of the present inventive concept.
Figure 3:
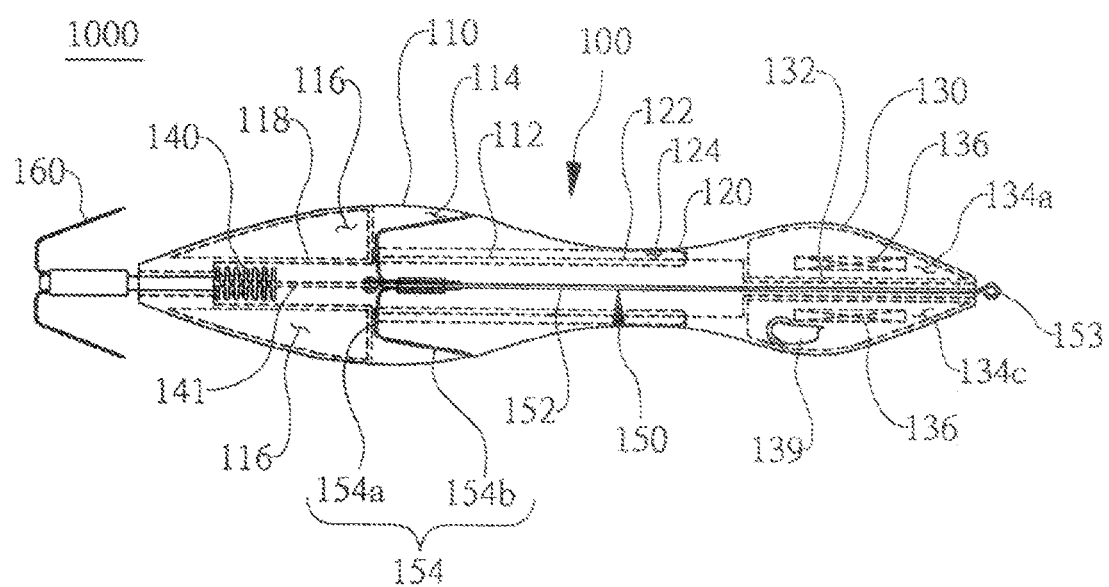
FIG. 3 is a vertical sectional view of FIG. 2.
Figure 4:
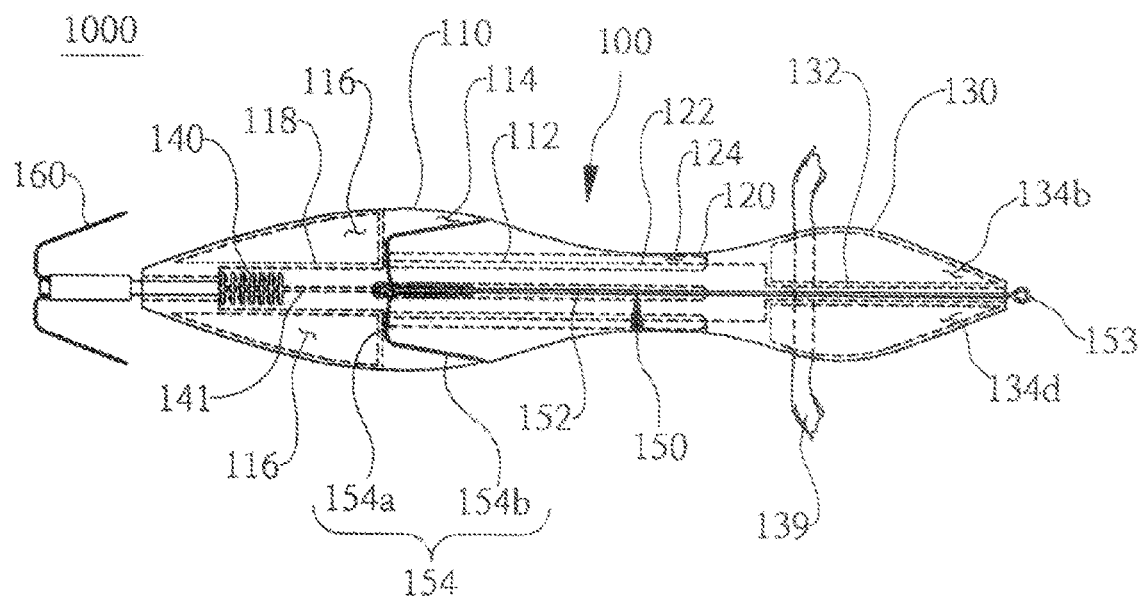
FIG. 4 is a horizontal sectional view of FIG. 2.

FIG. 2 schematically shows an artificial bait with movable hooks according to a first embodiment of the present inventive concept, FIG. 3 is a vertical sectional view of FIG. 2, and FIG. 4 is a horizontal sectional view of FIG. 2.

Referring to FIGS. 2 to 4, an artificial bait 1000 with movable hooks according to a first embodiment of the present inventive concept is an artificial bait used for fishing, for example, for catching cephalopods, especially cautious cuttlefish, which includes a body 100, an elastic part 140, and a hook member 150.

The body 100 has the shape similar to a live bait such as a craw fish, and the like and is made of a synthetic resin. A fluorescent substance may be coated on the surface of the body 100 to attract cephalopods. For example, the body 100 has a first convex portion 110 and a concave portion 120 extending sequentially in a direction from one end portion thereof toward the other end portion thereof in a longitudinal direction thereof and a second convex portion 130 extending integrally from the end portion of the concave portion 120 located in the opposite direction to the first convex portion 110, so that the body 100 may have the shape of sandglass whose length is long. In specific, the first convex portion 110 becomes increased in diameter as it goes toward the center thereof from both sides thereof. The concave portion 120 becomes decreased in diameter as it goes toward the center thereof from both sides thereof, and accordingly, the body 100 becomes decreased in diameter in a direction from the first convex portion 110 toward the concave portion 120. The second convex portion 130 becomes increased in diameter as it goes toward the center thereof from both sides thereof, and accordingly, the body 100 becomes increased in diameter in a direction from the concave portion 120 toward the second convex portion 130.

Further, a first sliding guide portion 112 is formed inside the first convex portion 110 in a longitudinal direction of the first convex portion 110, a second sliding guide portion 122 is formed inside the concave portion 120 in a longitudinal direction of the concave portion 120, and a third sliding guide portion 132 is concavely formed inside the second convex portion 130 in a longitudinal direction of the second convex portion 130, so that a wire 152 as will be discussed later is movable along the first sliding guide portion 112, the second sliding guide portion 122, and the third sliding guide portion 132. The first sliding guide portion 112 and the second sliding guide portion 122 communicate with each other as an integral body with each other, and the second sliding guide portion 122 and the third sliding guide portion 132 communicate with each other as an integral body with each other.

Further, first guide holes 114 are formed in a direction from the first sliding guide portion 112 toward the periphery of the first convex portion 110, that is, toward the outer peripheral surface of the first convex portion 110, so as to guide movable hooks 154 as will be discussed later moving inside the first convex portion 110, and one side of the first guide holes 114 communicates with the first sliding guide portion 112, while the other side thereof is passing through the periphery of the first convex portion 110. Further, second guide holes 124 are formed in a direction from the second sliding guide portion 122 toward the periphery of the concave portion 120, that is, toward the outer peripheral surface of the concave portion 120, so as to guide the movable hook 154 moving inside the concave portion 120, and one side of the second guide holes 124 communicates with the second sliding guide portion 122, while the other side thereof is passing through the periphery of the concave portion 120. The number of first guide holes 114 and the number of second guide holes 124 correspond to the number of movable hook 154, respectively, and the first guide holes 114 and the second guide holes 124 are arranged radially on the outer peripheral surfaces of the first convex portion 110 and the concave portion 120, respectively.

Also, buoyant portions 116 as empty space are formed inside the first convex portion 110. That is, a space portion 118 as will be discussed later is formed at the central portion of the interior of the first convex portion 110, and the buoyant portions 116 as the empty space are formed on the upper and lower portions with respect to the space portion 118. An auxiliary hook member 160 having a plurality of hooks arranged radially protrudes from the end portion of the first convex portion 110 in the opposite direction to the concave portion 120. One auxiliary hook member 160 may be provided, and otherwise, a plurality of auxiliary hook members 160 may be continuously provided in the longitudinal direction of the body 100. The auxiliary hook member 160 is fixed to catch octopus ocellatus, cuttlefish, and the like. The auxiliary hook member 160 has a given load, but since the buoyant portions 116 having given buoyancy are formed inside the first convex portion 110, in a state where the body 100 is located underwater, the first convex portion 110 can be kept at a horizontal state thereof, without sagging down, because of the given load of the auxiliary hook member 160.

Further, a first accommodation portion 134a, a second accommodation portion 134b, a third accommodation portion 134c, and a fourth accommodation portion 134d are formed sequentially inside the second convex portion 130 along the inner peripheral surface of the second convex portion 130 around the third sliding guide portion 132. The first accommodation portion 134a and the third accommodation portion 134c face each other, and the second accommodation portion 134b and the fourth accommodation portion 134d face each other. Weights are inserted into the first accommodation portion 134a and the third accommodation portion 134c, respectively, and closed empty space portions are formed in the second accommodation portion 134b and the fourth accommodation portion 134d, respectively. The second accommodation portion 134b and the fourth accommodation portion 134d are configured to have buoyancy so that the body 100 can be kept at a horizontal level underwater. Further, the second accommodation portion 134b and the fourth accommodation portion 134d may be divided into a plurality of space portions by means of partition walls. Further, feathers 139 are mounted on both sides of the outer peripheral surface of the second convex portion 130 to attract cephalopods.

The elastic part 140 serves to apply elastic pressure to the wire 152, is formed of a coil spring, and is located at one end portion of the interior of the body 100. In this case, the space portion 118 is formed at the center of one end portion of the first convex portion 110 to accommodate the elastic part 140 therein. The elastic part 140 is connected to the wire 152 by means of an elastic connector 141 to apply the elastic pressure in a direction where the movable hooks 154 as will be discussed later are close to one end portion of the body 100, that is, the first convex portion 110.

The hook member 150 includes the wire 152, the movable hooks 154, and a connector 153. The wire 152 is formed of a steel wire, a nylon wire, or the like and movable longitudinally along the first to third sliding guide portions 112, 122, and 132 at the inside of the body 100. The movable hooks 154 have the shapes of fishing hooks and protrude from one side of the wire 152 located toward one end portion of the body 100 in the outer peripheral direction of the body 100. The movable hooks 154 protrude radially from one side of the wire 152. The connector 153 protrudes outward from the other side of the wire 152 located toward the other end portion of the body 100, passes through the other end portion of the body 100, and is connected to a fishing line of a user.

Figure 5:
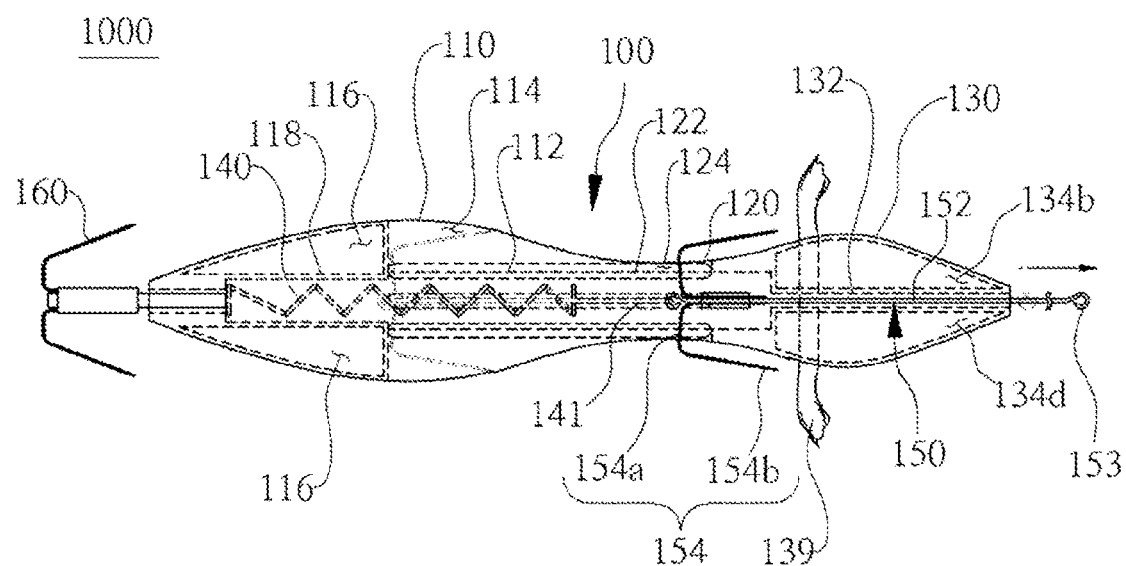
FIG. 5 shows a state where the movable hooks protrude outward from second guide holes in the artificial bait according to the first embodiment of the present inventive concept.

FIG. 5 shows a state where the movable hooks protrude outward from the second guide holes in the artificial bait according to the first embodiment of the present inventive concept.

Referring first to FIG. 4, the first convex portion 110 is convexedly formed, and accordingly, it has a relatively large diameter. If the movable hooks 154 move to one end portion of the body 100 by means of the elastic pressure of the elastic part 140 and are thus located at the first guide holes 114 of the first convex portion 110, they are hidden inside the first convex portion 110. Like this, if the movable hooks 154 are hidden inside the first convex portion 110, cephalopods, especially, cuttlefish recognizes that there are no movable hooks 154 inside the first convex portion 110 and thus hits the body 100. At that moment, a fisherman feels a bite to perform hook setting with a stronger force than the elastic pressure of the elastic part 140.

As a result, as shown in FIG. 5, the body 100 does not move at all, and the wire 152 at the inside of the body 100 moves in a direction distant from the elastic part 140 by means of the external pressure applied from the connector 153 through the hook setting, so that the movable hooks 154 move from the first guide holes 114 of the first convex portion 110 to the second guide holes 124 of the concave portion 120 along the wire 152. In this case, the center of the concave portion 120 is smaller in diameter than the first convex portion 110, and accordingly, the movable hooks 154 moving to the second guide holes 124 pass through the second guide holes 124 and thus protrude outward.

In the process of performing the hook setting, like this, the movable hooks 154 hidden inside the body 100 move along the second guide holes 124 of the body 100 and are exposed to the outside of the body 100, so that the cuttlefish, which is close to the body 100 or carefully hits the body 100, is easily caught by means of the movable hooks 154 unexpectedly protruding from the body 100 in the state where the body 100 does not move at all, without running away.

In the state where, through the hook setting, the movable hooks 154 move from the first convex portion 110 to the concave portion 120, the concave portion 120 becomes smaller as it goes toward the center thereof in the longitudinal direction thereof, one end portion of the second guide holes 124 is located at one end portion of the concave portion 120 in the longitudinal direction of the concave portion 120 which is connected to the first convex portion 110, and the other end portion of the second guide holes 124 is located at the center of the concave portion 120 in the longitudinal direction of the concave portion 120. Further, each movable hook 154 includes a protruding portion 154a locked onto the other end portion of the corresponding second guide hole 124 at the end of the wire 152 and then protruding outward from the concave portion 120 and an inclined portion 154b bent inclinedly from the end of the protruding portion 154a toward the other end portion of the concave portion 120 in the longitudinal direction of the concave portion 120. Like this, if the movable hooks 154 move to the concave portion 120, the protruding portions 154a of the movable hooks 154 are lockedly located onto the other end portion of the second guide holes 124, and accordingly, the movable hooks 154 may not move anymore. Further, the other end portion of the second guide holes 124 is a portion where the concave portion 120 is smallest in diameter, and accordingly, the inclined portions 154b protrude outward from the second guide holes 124 to the maximum extent. That is, if the protruding portions 154a of the movable hooks 154 lockedly move onto the end portions of the second guide holes 124, the inclined portions 154b of the movable hooks 154 protrude outward from the second guide holes 124 to the maximum extent, and accordingly, the cuttlefish can be more easily caught to the inclined portions 154b.

Figure 6:
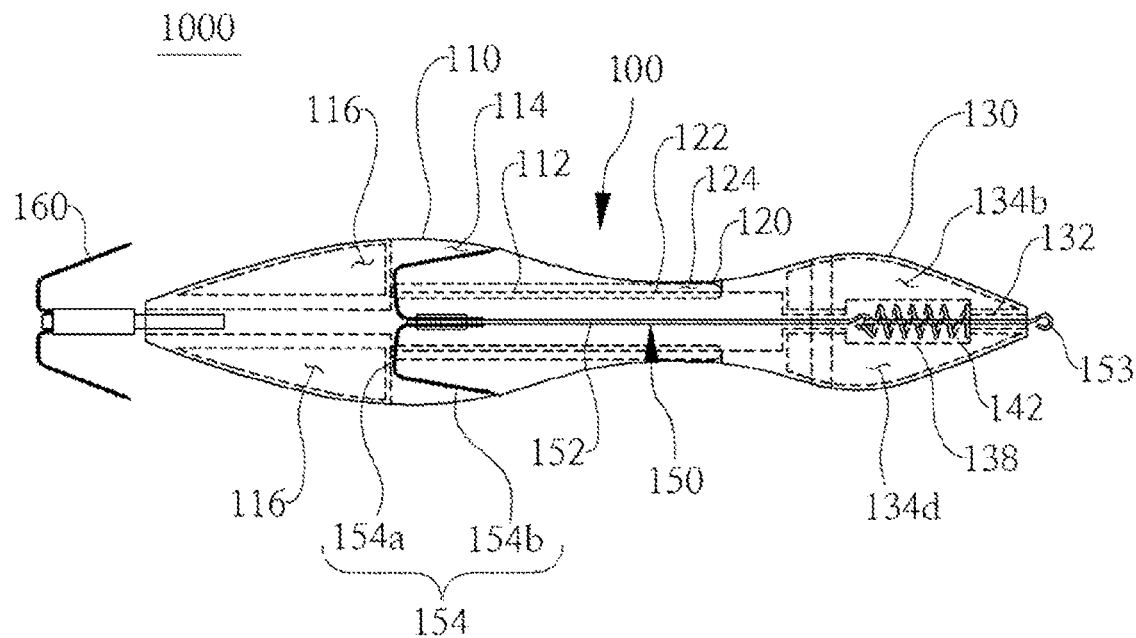
FIG. 6 shows a state where an elastic part is provided on a second convex portion in the artificial bait according to the first embodiment of the present inventive concept.
Figure 7:
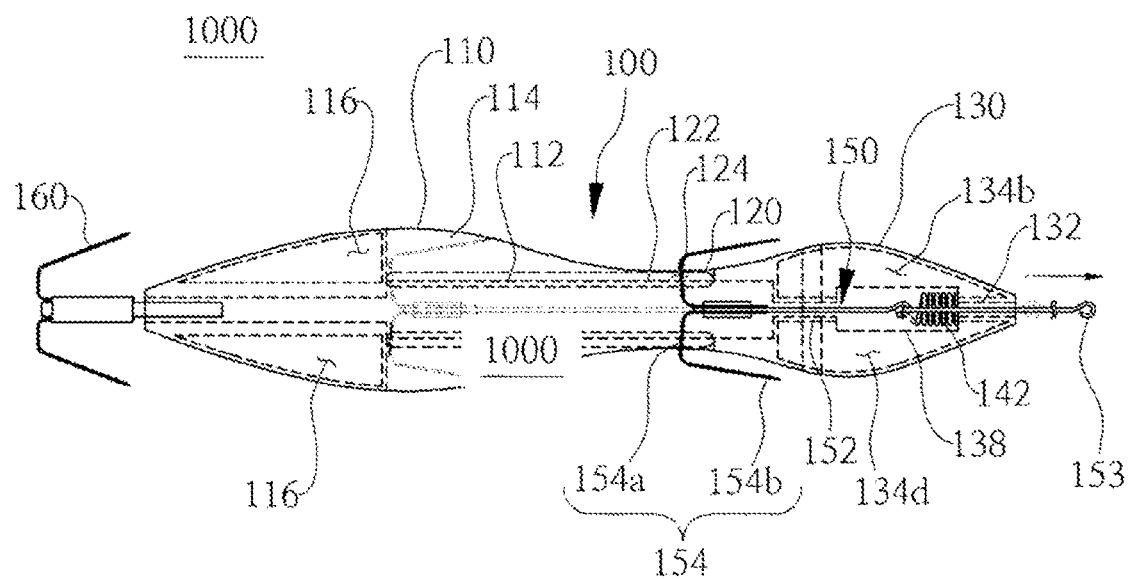
FIG. 7 shows a state where the elastic part is compressed by means of an external pressure in the artificial bait according to the first embodiment of the present inventive concept.

FIG. 6 shows a state where the elastic part is provided on the second convex portion in the artificial bait according to the first embodiment of the present inventive concept, and FIG. 7 shows a state where the elastic part is compressed by means of an external pressure in the artificial bait according to the first embodiment of the present inventive concept.

Referring to FIG. 6, a space portion 138 is formed at the end portion of the second convex portion 130, and the third sliding guide portion 132 communicates with the space portion 138. In this case, the elastic part 140 is located inside the space portion 138. The end portion of the wire 152 and the end portion of the connector 153 facing each other are connected together with the end portion of the elastic part 140 located toward the movable hooks 154. In this state, the elastic part 140 applies the elastic pressure in a direction where the movable hooks 154 become close to one end portion of the body 100, and the movable hooks 154 are located at one end portion of the interior of the body 100, that is, at the inside of the first convex portion 110.

Referring to FIG. 7, if the external pressure caused by the hook setting is applied to the connector 153, the connector 153 moves the elastic part 140 to the other end portion of the body 100 so that the elastic part 140 becomes compressed. Next, the wire 152 connected to the elastic part 140 moves to the other end portion of the body 100 to allow the movable hooks 154 to move toward the concave portion 120, and accordingly, the movable hooks 154 are exposed to the outside of the concave portion 120. Like this, in some cases, the elastic part 140 may be located at the other end portion of the interior of the body 100.

Figure 8:
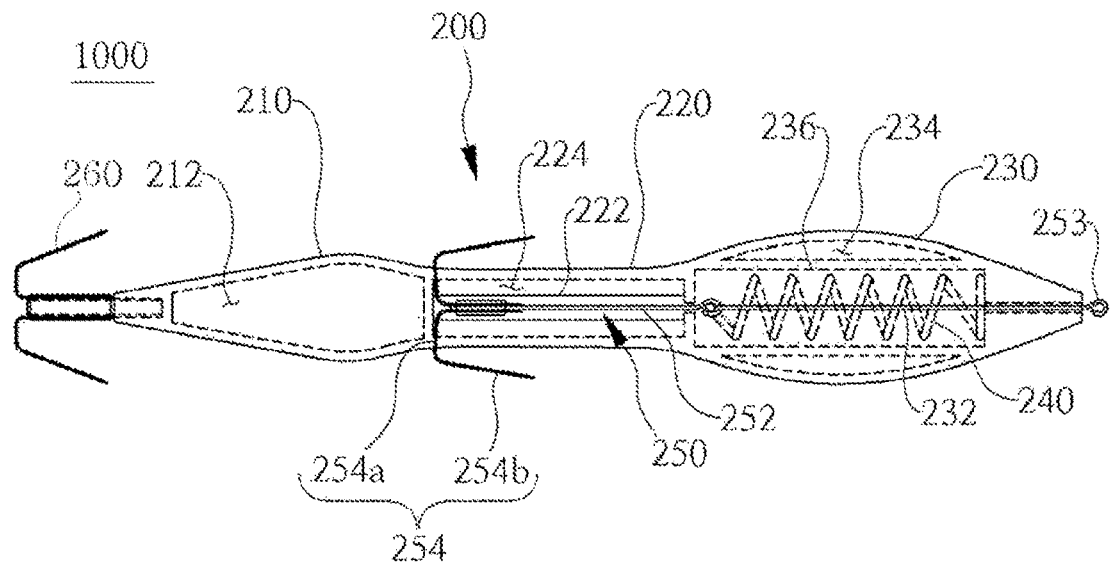
FIG. 8 schematically shows an artificial bait with movable hooks according to a second embodiment of the present inventive concept.
Figure 9:
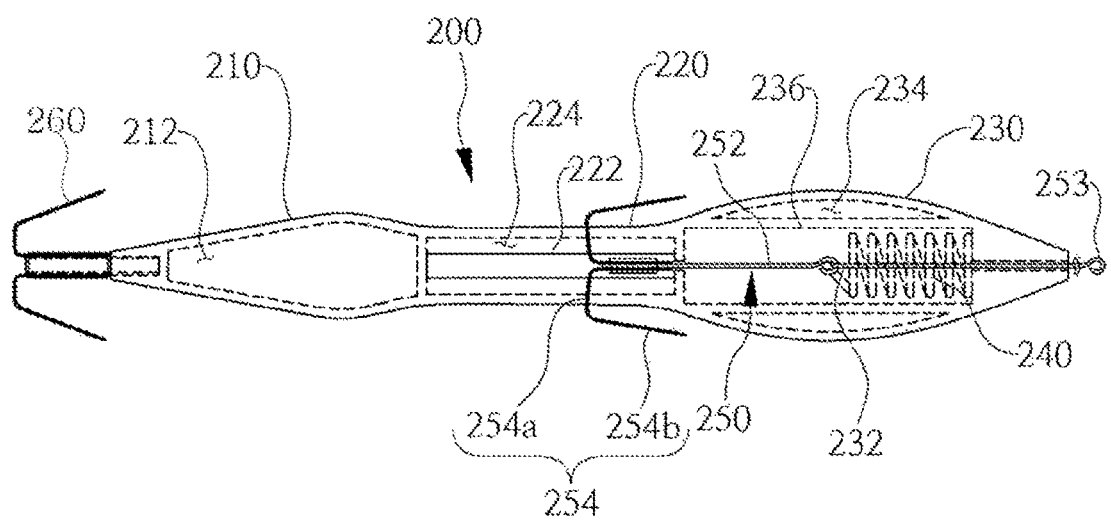
FIG. 9 shows a state where an elastic part is compressed by means of an external pressure in the artificial bait according to the second embodiment of the present inventive concept.

FIG. 8 schematically shows an artificial bait with movable hooks according to a second embodiment of the present inventive concept, and FIG. 9 shows a state where an elastic part is compressed by means of an external pressure in the artificial bait according to the second embodiment of the present inventive concept.

Referring to FIG. 8, an artificial bait with movable hooks 254 according to a second embodiment of the present inventive concept is an artificial bait used for fishing, for example, for catching cephalopods, especially cautious cuttlefish, which includes a body 200, an elastic part 240, and a hook member 250.

The body 200 has the shape similar to a live bait such as a craw fish, and the like and is made of a synthetic resin. A fluorescent substance may be coated on the surface of the body 200 to attract cephalopods. For example, the body 200 has a first body 210, a movable body 220, and a second body 230 extending sequentially in a direction from one end portion thereof toward the other end portion thereof in a longitudinal direction thereof.

The first and second bodies 210 and 230 are convexedly formed so that they are increased in diameter as they go toward the centers thereof in longitudinal directions thereof. The movable body 220 extends long in a longitudinal direction thereof, and for example, it has the shape of a column, cylinder, or the like. Further, a first sliding guide portion 222 is formed inside the movable body 220 in the longitudinal direction of the movable body 220, and a second sliding guide portion 232 is formed inside the second body 230 in a longitudinal direction of the second body 230, so that a wire 252 is movable along the first sliding guide portion 222 and the second sliding guide portion 232. The first sliding guide portion 222 and the second sliding guide portion 232 communicate with each other as an integral body with each other.

Further, guide holes 224 are formed in a direction from the first sliding guide portion 222 toward the periphery of the movable body 220, that is, toward the outer peripheral surface of the movable body 220, so as to guide movable hooks 254 moving inside the movable body 220, and one side of the guide holes 224 communicates with the first sliding guide portion 222, while the other side thereof is passing through the periphery of the movable body 220. The number of guide holes 224 corresponds to the number of movable hooks 154, and the guide holes 224 are arranged radially on the outer peripheral surface of the movable body 220.

Also, a first buoyant portion 212 as empty space is formed inside the first body 210, an elastic part accommodation portion 236 as empty space is formed at the center of the interior of the second body 230 to guide the elastic part 240, and a second buoyant portion 234 as empty space is formed between the elastic part accommodation portion 236 and the inner peripheral surface of the second body 230. The second sliding guide portion 232 passes through the center of the elastic part accommodation portion 236 in the longitudinal direction of the elastic part accommodation portion 236. Further, an auxiliary hook member 260 having a plurality of hooks arranged radially protrudes from the end portion of the first body 210 in the opposite direction to the movable body 220. A hook member 250 and the auxiliary hook member 260 have given loads, but since the first and second buoyant portions 212 and 234 having given buoyancy are formed inside the first body 210 and the second body 230, in a state where the body 200 is located underwater, the body 200 can be kept at a horizontal state thereof, without sagging down to any end portion thereof, because of the first and second buoyant portions 212 and 234. If the body 200 is kept at a horizontal state thereof, the cephalopods such as octopus ocellatus, cuttlefish, and the like recognize the body 200 as a live craw fish, and the like.

The elastic part 240 serves to apply elastic pressure to the wire 252, is formed of a coil spring, and is located at the elastic part accommodation portion 236 of the interior of the body 200. In this case, the elastic part 240 is connected to the wire 252 to apply the elastic pressure in a direction where the movable hooks 254 are close to one end portion of the body 200, that is, the first body 210. However, in some cases, the elastic part 240 may be located at the first body 210, as shown in FIG. 2.

The hook member 250 includes the wire 252, the movable hooks 254, and a connector 253. The wire 252 is formed of a steel wire, a nylon wire, or the like and movable longitudinally along the first and second sliding guide portions 222 and 232 at the inside of the body 200. The movable hooks 254 have the shapes of fishing hooks and include protruding portions 254a passing through the guide holes 224 from the end portion of the wire 252 and thus protruding outward from the movable body 220 and inclined portions 254b bent inclinedly from the ends of the protruding portions 254a. The movable hooks 254 protrude radially from one side of the wire 252.

The connector 253 has the shape extending in the longitudinal direction of the second body 230, and one end portion of the connector 253 is inserted into the second sliding guide portion 232 of the second body 230, while the other end thereof is passing through the other end portion of the second body 230 and being exposed to the outside of the second body 230. A fishing line is connected to the other end portion of the connector 253. The second sliding guide portion 232 passes through the center of the elastic part accommodation portion 236 in the longitudinal direction of the elastic part accommodation portion 236. Further, the end portion of the wire 252 and the end portion of the connector 253 facing each other are connected together with the end portion of the elastic part 240 located toward the movable hooks 254. In this state, if the elastic part 240 applies the elastic pressure to the wire 252, the movable hooks 154 exposed to the outside of the movable body 220 move to one end portion of the movable body 220.

Referring to FIG. 9, if cephalopods such as octopus ocellatus, cuttlefish, and the like hit the body 200, a fisherman feels a bite to perform hook setting with a stronger force than the elastic pressure of the elastic part 240. In this case, the body 200 does not move, and the wire 252 at the inside of the body 200 moves to the other end portion of the second body 230 by means of the external pressure applied from the connector 253 through the hook setting, so that the movable hooks 254 move from one end portion of the movable body 220 to the other end portion thereof along the wire 252. In this case, the movable hooks 254 pass through the guide holes 224 of the movable body 220 and are exposed to the outside of the movable body 220, so that the cuttlefish, which is close to the body 200 or carefully hits the body 200, is easily caught by means of the movable hooks 254 unexpectedly protruding from the body 200 in the state where the body 200 does not move, without running away.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

INDUSTRIAL APPLICABILITY OF THE INVENTION

Fishing

The invention claimed is:

1. An artificial bait comprising:
a body having a first end portion and a second end portion arranged at opposite ends of the body along a longitudinal direction of the body and also having an exterior surface defining a relatively wide region and a relatively narrow region arranged between the first end portion and a second end portion along the longitudinal direction;
a hook member movable relative to the first end portion and the second end portion of the body along the longitudinal direction; and
an elastic part connected between the body and the hook member,
wherein the hook member comprises:
 a wire connected to the elastic part;
 movable hooks connected to the wire; and
 a connector connected to the wire and, the connector passing through the second end portion of the body, wherein the connector is connectable to a fishing line,
wherein the elastic part is located within the body and is configured to apply an elastic force to the hook member such that the movable hooks are locatable within the relatively wide region in the absence of an external force greater than the elastic force applied to the connector,
wherein the body and hook member are configured such that the movable hooks are locatable to the relatively narrow region in the presence of an external force greater than the elastic force applied to the connector, and
wherein the movable hooks are sized to fit within the relatively wide region of the body but protrude outside the relatively narrow region of the body.

2. The artificial bait according to claim 1, wherein the body comprises:
a first convex portion at the relatively wide region and a concave portion at the relatively narrow region; and,
a sliding guide portion formed along the longitudinal direction within the first convex portion and the concave portion, wherein the wire is movable through the sliding guide portion; and,
guide holes formed along the longitudinal direction, the guide holes extending from the sliding guide portion to the exterior surface of the body to guide movement of the movable hooks.

3. The artificial bait according to claim 2,
wherein the concave portion becomes decreased in diameter toward a center in the longitudinal direction thereof, and
wherein each movable hook comprises a protruding portion and an inclined portion bent inclinedly from the end of the protruding portion toward the second end portion of the body.

4. An artificial bait comprising:
a body having a first end portion and a second end portion arranged at opposite ends of the body along a longitudinal direction of the body;
a hook member movable relative to the first end portion and the second end portion of the body along the longitudinal direction; and an elastic part connected between the body and the hook member, wherein the hook member comprises:
a wire connected to the elastic part;
movable hooks connected to the wire, wherein the moveable hooks extend outside of the body; and
a connector connected to the wire and, the connector passing through the second end portion of the body, wherein the connector is connectable to a fishing line, wherein the elastic part is located within the body and is configured to apply an elastic force to the hook member such that the movable hooks are locatable to a first location between the first end portion and the second end portion in the absence of an external force greater than the elastic force applied to the connector, wherein the body and hook member are configured such that the movable hooks are locatable to a second location between the first end portion and the second end portion in the presence of an external force greater than the elastic force applied to the connector, wherein the body comprises:
a first body, a movable body, and a second body extending sequentially in the longitudinal direction; and
a sliding guide portion formed in the longitudinal direction through which the wire is movable,
wherein the movable body has guide holes formed in the longitudinal direction through which the movable hooks are movable,
wherein the guide holes extend from the sliding guide portion to an exterior surface of the body.

5. The artificial bait according to claim 1, wherein the body comprises a space portion formed at one end portion or the other end portion thereof to accommodate the elastic part therein.

6. The artificial bait according to claim 1, wherein the movable hooks protrude radially from one side of the wire.

7. The artificial bait according to claim 1, wherein the body comprises auxiliary hooks protruding radially from the end portion thereof.

8. The artificial bait according to claim 1, wherein the body comprises buoyant portions as empty space formed therein.

\* \* \* \* \*